United States Patent
Matsuyama et al.

(10) Patent No.: US 6,817,768 B2
(45) Date of Patent: Nov. 16, 2004

(54) ROLLER BEARING

(75) Inventors: Hiroki Matsuyama, Nara (JP); Akiyuki Suzuki, Osaka (JP); Yasunari Abo, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 95 days.

(21) Appl. No.: 10/384,825

(22) Filed: Mar. 10, 2003

(65) Prior Publication Data
US 2003/0198420 A1 Oct. 23, 2003

(30) Foreign Application Priority Data
Mar. 13, 2002 (JP) ..................... P2002-068603

(51) Int. Cl.$^7$ .............................. F16C 19/00
(52) U.S. Cl. ..................... 384/450; 384/571
(58) Field of Search ................. 384/450, 565, 384/569, 564, 571

(56) References Cited

U.S. PATENT DOCUMENTS

2002/0051594 A1 * 5/2002 Takehara et al. ............ 384/450
2002/0181820 A1   12/2002 Suzuki et al. ............... 384/571

FOREIGN PATENT DOCUMENTS

| JP | 7-42746 | 2/1995 |
|---|---|---|
| JP | 10-110733 | 4/1998 |
| WO | WO 99/13235 | 3/1999 |

* cited by examiner

Primary Examiner—Thomas R. Hannon
(74) Attorney, Agent, or Firm—Jordan and Hamburg LLP

(57) ABSTRACT

The present invention provides a roller bearing in which a plurality of rollers is interposed between an inner ring member and an outer ring member, and a flange having a guide surface for guiding an end surface of the roller in a sliding contact manner is provided at an end portion of at least one of the inner ring member and outer ring member in an axial direction. Three-dimensional surface roughness of the end surface of the roller is defined to a value which satisfies conditional expressions of $Sa \leq 0.1$ μm and $0.15$ μm $\leq Svk \leq 0.30$ μm, where Sa is arithmetical average roughness based on rough curve and Svk is reduced valley depth based on the rough curve.

6 Claims, 6 Drawing Sheets

F I G. 9
SMALL AMOUNT OF OIL SUPPLY SEIZURE TEST
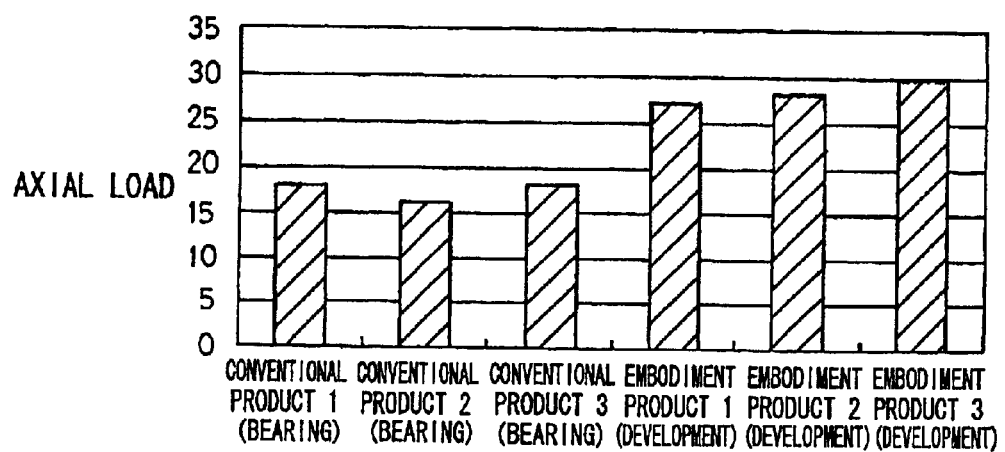
F I G. 10
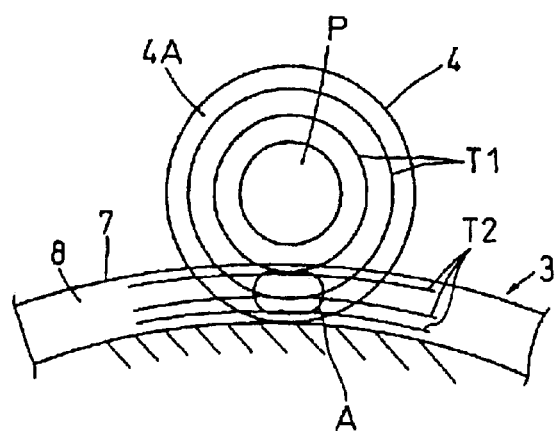

ROLLER BEARING

BACKGROUND OF THE INVENTION

The present invention relates to a roller bearing, and more particularly to an improvement of seizure resistance characteristics based on roughness of an end surface of a roller.

A tapered roller bearing has a plurality of tapered rollers between an inner ring member and an outer ring member. The inner ring member is provided at its axially opposite ends with flanges (or ribs). The flanges have guide surfaces for guiding opposite end surfaces of a large-diameter side and a small-diameter side of the tapered rollers in a sliding contact manner. A contact portion between the flanges on the axially opposite ends of the inner ring member and the end surfaces of the large-diameter side and small-diameter side of the tapered rollers is lubricated with lubricant such as oil, grease or the like. Such end surfaces of the tapered rollers and the guide surfaces of the flanges of the inner ring member have different microscopic surface shapes depending upon polishing methods at the time of surface finishing. Such microscopic surface shapes will be explained with reference to FIG. 10. A reference numeral 4A denotes a large-diameter side end surface of the tapered rollers, and a reference numeral 8 denotes a guide surface in the flange of the inner ring member. The large-diameter side end surface 4A has a microscopic surface shape in which a large number of polished marks T1 formed by the surface finishing working are remained only in the circumferential direction of the large-diameter side end surface 4A. Polished marks T2 are also remained in the guide surface 8 of the inner ring member 3 only in the circumferential direction of the guide surface 8 likewise. Such polished marks are microscopic surface shapes obtained by rotating the tapered roller or the inner ring member around its axis in a constant direction and by polishing by a constant grindstone. In FIG. 10, a symbol A denotes a sliding contact portion between the large-diameter side end surface 4A of the tapered roller and the guide surface 8 of the inner ring member. In such a tapered roller bearing, it is desired to enhance the seizure resistance characteristics when a high load is applied by enhancing the retention ability of lubricant oil in a circumferential direction of the roller end surface.

SUMMARY OF THE INVENTION

According to a roller bearing of the present invention, a plurality of rollers is interposed between an inner ring member and an outer ring member, and a flange (or rib) having a guide surface for guiding an end surface of the roller in a sliding contact manner is provided at an end portion of at least one of the inner ring member and outer ring member in an axial direction. In the roller bearing, three-dimensional surface roughness of the end surface of the roller or the guide surface of the flange is defined to a value which satisfies conditional expressions of $Sa \leq 0.1$ μm and $0.15\text{ m} \leq Svk \leq 0.30$ μm, where Sa is arithmetical average roughness based on roughness curve and Svk is reduced valley depth based on the Abbott-firestone curve (bearing curve).

An experiment of the present inventors shows that if the surface roughness of the roller end surface or the guide surface of the flange is defined as the above-described conditional expressions, the seizure resistance characteristics can largely be enhanced. Herein, a surface defined by the conditional expressions of $Sa \leq 0.1$ μm and $0.15$ μm$\leq Svk \leq 0.30$ μm is a surface in which valleys of predetermined depth are dispersed on a predetermined smooth surface, and it is possible to effectively enhance the reserving ability of lubricant oil between surfaces of members which relatively slide on each other.

The above-described arithmetical average roughness Sa indicates smoothness of a surface. If this Sa value is greater than 0.1 μm, smooth sliding motion required by the relatively sliding portions of the roller bearing can not be maintained, friction of the relatively sliding portions becomes great (or increases) and the rotation torque becomes excessively great (or increases). As a result, seizure is prone to be generated when a high load is applied.

The above-described reduced valley depth Svk indicates a depth of valley which exists in the surface and affects the oil-retention ability. If this Svk value is smaller than 0.15 μm, since the depth of the valleys measured from the smooth surface is small, it can not be the that the valleys are dispersed in the smooth surface, and sufficient lubricant oil-retention ability can not be exhibited. On the other hand, if the depth of the valleys from the smooth surface is greater than 0.3 μm, the depth of the valley is excessively deep, and the smooth sliding motion required for the relatively sliding portions of the roller bearing is hindered on the contrary. When the depth of the valley is excessively deep, the Sa value also becomes greater than 0.1 μm.

The state in which valleys are dispersed in the smooth surface means a state in which the number of valleys is not too much, and a plurality of valleys are not arranged in a constant direction, e.g., in the circumferential direction, the-radial direction and the like. When the number of valleys is excessively great, the Sa value becomes greater than 0.1 μm.

When there is no valley in the smooth surface, the smooth surface and the valleys are assimilated into the same level and thus, the Svk value becomes smaller than 0.15 μm. When valleys exist in the smooth surface but the number of the valleys is too small, there are many cases in which no valleys exist in a measuring location in the smooth surface and thus, the Svk measuring value tends to become smaller than 0.15 μm. Therefore, it is possible to define the dispersion degree of valleys by defining the Sa and Svk in the above-described ranges.

A reason why a two-dimensional surface roughness parameter which is defined by the conventionally used JIS B 0601 or ISO 4287 etc., can not be used for defining the distinctive surface of the present invention will be explained below. As described above, the surface of the present invention is characterized in that valleys having predetermined depth are disposed in the predetermined smooth surface. It is necessary to define the surface shape by reliably detecting and correctly quantifying the dispersed valleys irrespective of the measuring locations on the surface, and irrespective of directions of the valleys. Here, If a profile on one straight line is measured for defining such a surface using the conventional two-dimensional surface roughness parameter, valleys exist or do not exist depending upon the measuring locations. The profile of the surface largely differs between a case in which a direction of a length of the valley and a direction of the measuring straight line coincide with each other and a case in which they do not coincide with each other, and the roughness parameter value also largely differs. Therefore, even if the member's surface is the same, the two-dimensional surface roughness parameter largely differs depending upon the measuring locations and measuring direction. That is, variation in measured values is large depending upon the microscopic shape of a surface, and it is extremely difficult to correctly define the microscopic shape of the surface.

As described above, a plurality of dispersed valleys of the invention are not aligned in a constant direction. Therefore, when the surface roughness is to be measured, the surface profile largely differs depending upon the measuring locations and the measuring direction, and it is difficult to define the microscopic shape of the surface. The three-dimensional surface roughness parameter including the Sa and Svk is a parameter which is obtained by a three-dimensional surface shape within a predetermined flat surface region not by a surface profile on a straight line. Therefore, when specific shapes such as valleys exist (are dispersed) on a surface at intervals of some degree or less, it is possible to substantially reliably detect the specific shapes, and to quantify the number, the size and the like of the specific shapes. For this reason, the three-dimensional surface roughness parameter was applied in the present invention.

A reason why the Sa and Svk are selected from a large number of three-dimensional surface roughness parameters is that the Sa and Svk are optimal for defining the microscopic surface shape which is distinctive for the present invention in which valleys are dispersed on a predetermined flat surface. It is described in Japanese Patent Application Laid-open No. 2000-205275 that a three-dimensional surface roughness parameter is effective and necessary for defining such a special surface in terms of quantification. The valley in this invention means a stripe shaped valley, not a dot-like valley.

BRIEF DESCRIPTION OF THE DRAWING FIGURES

FIG. 9 is a graph showing a result of seizure text with small amount of oil supply with respect to the large-diameter side end surfaces of the tapered rollers of the embodiment products and the conventional products;

FIG. 10 is a front view showing valleys of a roller and a flange; and

In all these figures, like components are indicated by the same numerals.

DETAILED DESCRIPTION

Figure 1:
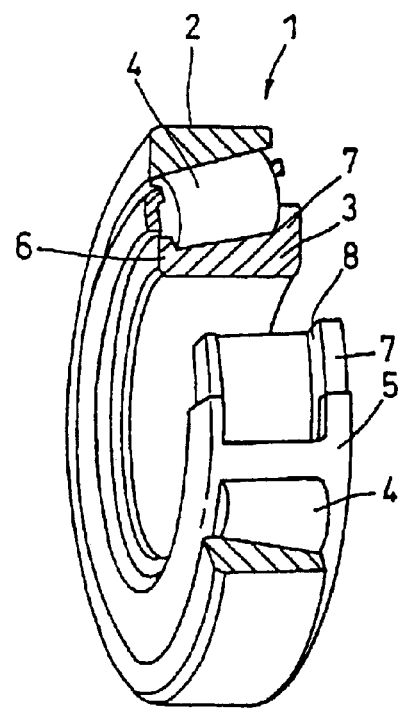
FIG. 1 is a partially cut-away perspective view of a tapered roller bearing according to an embodiment of the present invention.
Figure 2:
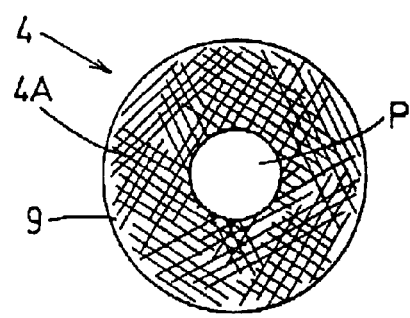
FIG. 2 is a front view of a large-diameter side end surface of the tapered roller shown in FIG. 1.

Referring to the drawings, FIGS. 1 and 2 show a tapered roller bearing according to the present embodiment. FIG. 1 is a partially cut-away perspective view of the bearing, and FIG. 2 is a front view of a large-diameter side end surface of the tapered roller. First, referring to FIG. 1, a tapered roller bearing 1 comprises an outer ring member 2, an inner ring member 3, a plurality of tapered rollers 4 interposed between both the members 2 and 3, and a holding member 5 for holding the tapered rollers 4. Each the tapered roller 4 is provided at its axial one side with a large-diameter side end surface 4A. The outer ring member 2 has a constant outer diameter, and a raceway diameter of a roller raceway surface of an inner diameter of the outer ring member 2 is increased toward axial one direction in conformance with the outer diameter of the tapered roller 4. The inner ring member 3 has a constant inner diameter, and a roller raceway surface of an outer diameter thereof is increased in axial one direction in conformance with the outer diameter of the tapered roller 4. The inner ring member 3 is provided at its axial one side end with a large-diameter side flange 7 and at the axial other side end with a small-diameter side flange 6. The tapered rollers 4 and both the members 2 and 3 are lubricated with oil or grease. The large-diameter side flange 7 of the inner ring member 3 guides a large-diameter side end surface 4A of each the tapered roller 4 in a state in which the large-diameter side end surface 4A is in slide contact with a guide surface 8. A symbol P denotes a circular shallow recess at a central portion of the large-diameter side end surface 4A of the tapered roller 4. The three-dimensional surface roughness of the large-diameter side end surface 4A of the tapered roller 4 is set to a value which satisfies both the following conditional expressions (1) and (2):

$$Sa \leq 0.1 \ \mu m \quad (1)$$

$$0.15 \ \mu m \leq Svk \leq 0.30 \ \mu m \quad (2)$$

Herein, the Svk is preferably from $0.20 \ \mu m \leq Svk \leq 0.30 \ \mu m$, more preferably from $0.25 \ \mu m \leq Svk \leq 0.30 \ \mu m$.

Herein, the Sa denotes an arithmetical average roughness in an end surface of the tapered roller 4 obtained by three-dimensional surface roughness measurement. The Svk denotes a reduced valley depth in the end surface of the tapered roller 4 also obtained by three-dimensional surface roughness measurement. More specifically, the arithmetical average roughness Sa is obtained by broadening two-dimensional arithmetical average roughness Ra into a three-dimensional value, and is obtained by dividing (splitting), by a measurement area, a volume of a portion surrounded by a surface shape curve surface and an average surface. When the average surface is defined as an XY surface and the vertical direction is defined as a Z axis and a measured surface shape curve line is defined as Z=f(x, y), the arithmetical average roughness Sa is defined by the following expression.

Arithmetic Expression 1

$$Sa = \frac{1}{L_x L_y} \int_0^{L_x} \int_0^{L_y} f(x, y) dx dy$$

Where Lx is a measurement length in x direction, Ly is a measurement length in y direction, x is a coordinate in x direction on the measurement surface, and y is a coordinate in y direction on the measurement surface.

The above expression becomes as follows in a form of digital:

Arithmetic Expression 2

$$Sa = \frac{1}{MN}\sum_{j=1}^{N}\sum_{i=1}^{M}\eta(x_i, y_j)$$

Where $\eta(x_i, y_j)$ is a height in the vertical direction in coordinates $(x_i, y_j)$, M is the number of discrete data in the x direction, N is the number of discrete data in they direction, $x_i$ is the i-th coordinate in the x direction, $y_j$ is the j-th coordinate in the y direction (see Development of Method for the Characterisation of Roughness in Three Dimension, edited by K J Stout University of Huddersfield; Penton Press).

The reduced valley depth Svk is obtained by broadening the two-dimensional Rvk into three-dimensional value, and shows the depth of valleys existing on the smooth surface. In order to obtain the Svk, a height $\eta(x_i, y_j)$ of each point on the measurement surface is first obtained, and a bearing curve of the entire surface is obtained. Next, using this value, the Svk is obtained by the same method as that for obtaining the Rvk (Reduced valley depth) which is selected in ISO specification 13565-5 (see "Development of Method for the Characterisation of Roughness in Three Dimension" edited by K J Stout University of Huddersfield; Penton Press, regarding the details of the definitions and arithmetical methods of Sa and Svk). In reality, it can be obtained simultaneously with the bearing curve if a later-described analysis software is used.

Features of the embodiment will be explained in detail below.

First, a structure for making the large-diameter side end surface 4A of the tapered roller 4 into a surface roughness which satisfies the above conditional expressions will be explained. In this embodiment, as shown in FIG. 2, microscopic valleys having predetermined depth look like groove-like marks are dispersed in the large-diameter side end surface 4A in predetermined density so that the surface roughness of the large-diameter side end surface 4A satisfies the conditional expressions. The large-diameter side end surface 4A is provided at its central portion with a circular shallow groove P. This groove P is not polished. If the valleys 9 having predetermined depth are dispersed in the large-diameter side end surface 4A of the tapered roller 4 in the predetermined density in this manner, its surface roughness is in a state in which thin and long grooves exist in places on the smooth surface.

In this embodiment, the large-diameter side end surface 4A of the tapered roller 4 is formed into a smooth surface and then, the predetermined valleys are dispersed. Therefore, the lubricant-retention ability with respect to the slide contact can be smoothly held irrespective of a surface state of a mating member of the sliding contact. Therefore, it is possible to restrain the lubricant oil film from being interrupted from the sliding contact portion between the end surface of the roller and the guide surface of the flange. Therefore, it is possible to suppress the heat caused by friction, and seizure life can be enhanced.

Figure 3:
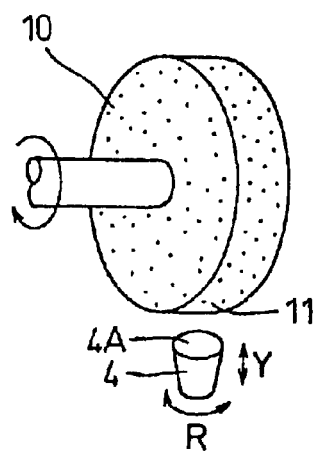
FIG. 3 is a key map view used for explaining a polishing method of an end surface of the tapered roller.

With reference to FIG. 3, polishing working for dispersing the valleys 9 will be explained.

The tapered roller 4 repeats, in extremely short time, the contact for polishing and evacuation from the contact position with respect to the polishing surface 11 of the polishing disk grindstone 10 for example. At that time, the tapered roller 4 is polished while being rotated at constant speed around its axis. At that time, free small grindstones (or free abrasive grain) which are different from the grindstone 10 are introduced between the large-diameter side end surface 4A and the polishing surface 11.

More particularly, in a state in which the tapered roller 4 is supported by a supporting tool such as a chuck (not shown), the large-diameter side end surface 4A of the tapered roller 4 is opposed to the polishing surface 11 of the grindstone 10 such that the large-diameter side end surface 4A can reciprocate with respect to the polishing surface 11 (reciprocating motion along the y direction in FIG. 3). The supporting tool is rotated around its axis at predetermined speed (rotated in the constant direction which is an R direction in FIG. 3) while keeping the opposed state in which the polishing surface 11 and the large-diameter side end surface 4A are in parallel to each other, thereby rotating the tapered roller 4 at predetermined speed. Then, the supporting tool is moved in the y direction by control of control means provided in the polishing device, the large-diameter side end surface 4A of the tapered roller 4 is brought into contact with the grindstone 10 such that the large-diameter side end surface 4A is polished by the grindstone 10 for extremely short time, and the large-diameter side end surface 4A is immediately evacuated from the polishing position, and these actions are repeated. With this, in the large-diameter side end surface 4A of the tapered roller 4, even if the tapered roller 4 is rotated as described above, the large-diameter side end surface 4A is polished in a state in which the polishing direction of the large-diameter side end surface 4A by the grindstone 10 is not constant. Therefore, a predetermined smooth surface is formed on the large-diameter side end surface 4A of the tapered roller 4 by abrasive grain of the grindstone 10, and the large number of valleys are dispersed in the large-diameter side end surface 4A of the tapered roller 4 mainly by cutting action of the free grindstone as shown in FIG. 2.

Figure 4:
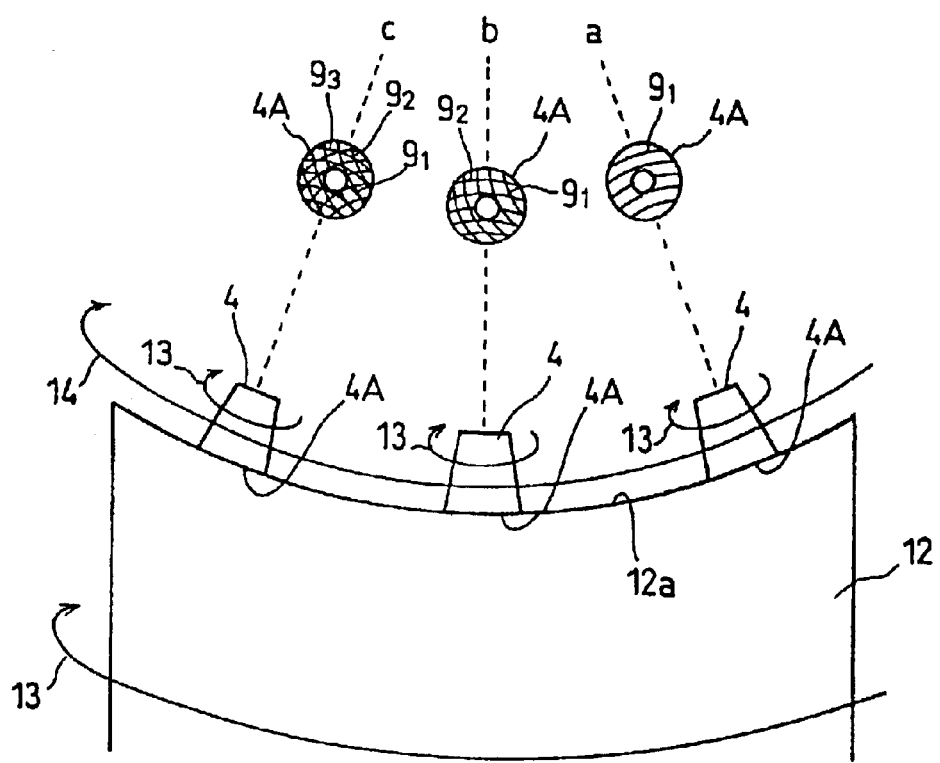
FIG. 4 is a view used for explaining another polishing method of the end surface of the tapered roller.

With reference to FIG. 4, another polishing working method for leaving the valleys 9 will be explained. In FIG. 4, a reference numeral 12 denotes a polishing working shaft which rotates around its axis in a direction of an arrow 13 at predetermined rotation speed. An end surface 12a of the polishing working shaft 12 is a polishing working surface (grindstone surface) formed into predetermined recess curve surface. The tapered roller 4 rotates in the direction of the arrow 13, and in this state, the tapered roller 4 is transferred in a direction of an arrow 14 in FIG. 4 such that the tapered roller 4 revolves in a state in which the large-diameter side outside surface 4A of the tapered roller 4 is in contact with the end surface 12a along the end surface 12a of the polishing working shaft 12. At that time, the free abrasive grains (or small grindstones) which are different from the grindstone are introduced between the large-diameter side end surface 4A of the tapered roller 4 and the polishing working surface 12a.

First, when the tapered roller 4 is in a transfer position a, the large-diameter side end surface 4A is polished by the polishing working surface 12a of the polishing working shaft 12, and valleys are formed in a first direction by the cutting effect of the free abrasive grain. Next, when the tapered roller 4 is in a transfer position b, valleys are formed in the large-diameter side end surface 4A also in a second direction which is different from the first direction in the same manner. When the tapered roller 4 is in a transfer position c, valleys are formed in the large-diameter side end surface 4A also in a third direction which is different from the first and second directions in the same manner. In this manner, while the large-diameter side end surface 4A of the tapered roller 4 is transferred in a direction of an arrow 14, the large-diameter side end surface 4A is polished by the grindstone surface, and a large number of valleys 9 are disposed in directions which are not constant by the cutting effect of the free abrasive grain.

In this description, the valleys 9 have a form in which the tapered roller 4 has three directions in three transfer positions a, b and c. In reality, since both the tapered roller 4 and polishing working shaft 12 rotate, the plurality of are dispersed in non-constant directions uniformly over the entire large-diameter side end surface 4A. Further, it is possible to finish the surface into a predetermined roller end surface roughness by appropriately setting the polishing conditions such as shape of the polishing working surface, kind of grindstone, kind of free abrasive grain, diameter of grain, shape, introducing amount, the number of rotations of the polishing working shaft, the number of rotations of roller, revolving speed, contact force between the roller end surface and the working surface.

A non-oil supply seizure test and small amount of oil supply test were carried out under poor lubricating conditions with respect to conventional products and embodiment products which has tapered rollers 4 in which predetermined valleys are dispersed based on this polishing method. The test conditions will be explained. In both of the conventional products and the embodiment products used tapered roller bearings each having an inner diameter of 35.9 mmϕ, an outer diameter of 72.2 mmϕ and a width of 25.4 mm. Specifications of the conventional products are as follows. That is, the guide surface 8 in the large-diameter side flange 6 of the inner ring member 3 is polished by polishing working in a constant direction (constant rotation in circumferential direction), and the average roughness Rz of ten points is 0.44 μm. The surface roughness of the large-diameter side end surface 4A of the tapered roller 4 is polished by a through feed working device in a constant direction (constant rotation in circumferential direction), and the Sa value is 0.068 μm, and the Svk value is 0.128 μm.

The specifications of the embodiment products are as follows. That is, roughness of the guide surface 8 in the large-diameter side flange 6 of the inner ring member 3 is the same as that of the conventional product.

The roughness of the large-diameter side end surface 4A of the tapered roller 4 was polished into such a state in which a plurality of valleys were dispersed in non-constant direction by the above-described method, the Sa value was set to 0.099 μm, and the Svk value was set to 0.286 μm. The grindstone at that time was one which is generally used such as an alumina-based abrasive grain or the like. A bonding agent which was generally used such as resin-based bond was used. As the free abrasive grain, an abrasive grain constituting the above grindstone was used. Concretely, alumina-based abrasive grain having grain diameter of 40 to 70 μm was used, and a resin bonding agent was used.

Figure 5:
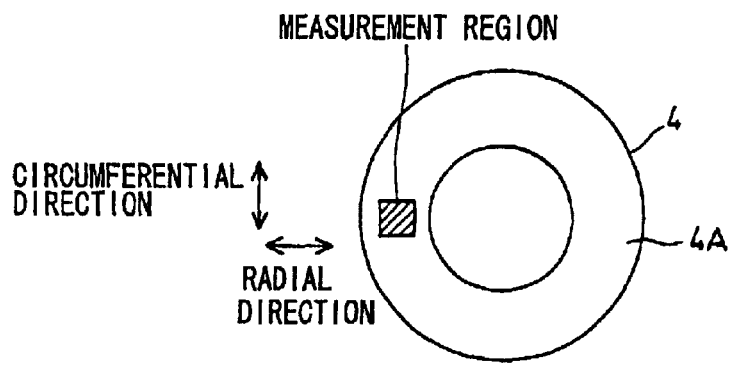
FIG. 5 is a plan view of the large-diameter side end surface of the tapered roller used for explaining the measuring method of three-dimensional surface roughness.

The roughness was measured by the following method using a Talyscan 150 manufactured by Taylor-Hobson, which is a three-dimensional surface roughness measuring device. This is shown in FIG. 5. FIG. 5 shows the large-diameter side end surface 4A of the tapered roller 4. A measuring position is a position shown in FIG. 5 of the large-diameter side end surface 4A of the tapered roller 4. The tapered roller 4 is fixed to a sample table by a jig such as a socket. The measuring size is 0.8 mm in the radial direction and 0.8 in the circumferential direction. When the tapered roller 4 is too small and can not be measured using the above size, the size is set to 0.5 mm×0.5 mm or greater. The measuring interval is 5 μm in both radial direction and circumferential direction. Scanning speed is 1000 mm/s. A Gausian filter is used as the roughness filter. A cut-off length is 0.25 mm. In the above measurement, the following (1) to (5) are carried out. (1) A sample table is moved in the x direction (corresponding to the radial direction), thereby parallel scanning a stylus in the x direction. (2) The sample table is moved in the y direction (corresponding to the circumferential direction) on one scan basis in the x direction. (3) The above (1) and (2) are repeated to complete the data acquisition. (4) Raw data is flattened, and spherical shape is removed. (5) A curl component is removed to extract the rough component. From the surface roughness obtained by the above method, the Sa and the bearing curve are obtained. It is possible to automatically obtain these values by the above-defined method using an analysis software "Talymap" manufactured by Taylor-Hobson.

Figure 6:
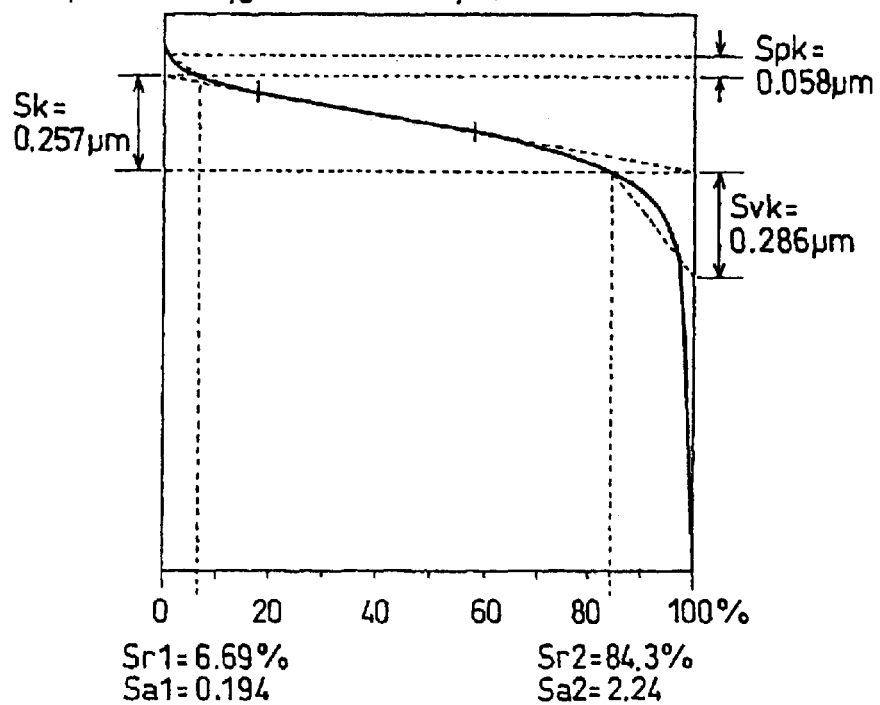
FIG. 6 is a graph showing a bearing curve of the large-diameter side end surface of the tapered roller of the embodiment product.

FIG. 6 shows a bearing curve of the large-diameter side end surface 4A of the tapered roller in the embodiment product obtained by the above roughness measurement. In FIG. 6, the Svk shows reduced valley depth, the Sk shows core roughness depth, the Spk shows reduced summit height, the Sr1 shows upper bearing area, the Sr2 shows lower bearing area, the Sa1 shows area of triangle equivalent to the summits, the Sa2 shows area of triangle equivalent to the valleys. These values are obtained by broadening the Rvk, Rk, Rpk, Rr1, Rr2, Ra1, Ra2 defined in ISO specification 13565-2 into three-dimensional values.

Figure 7:
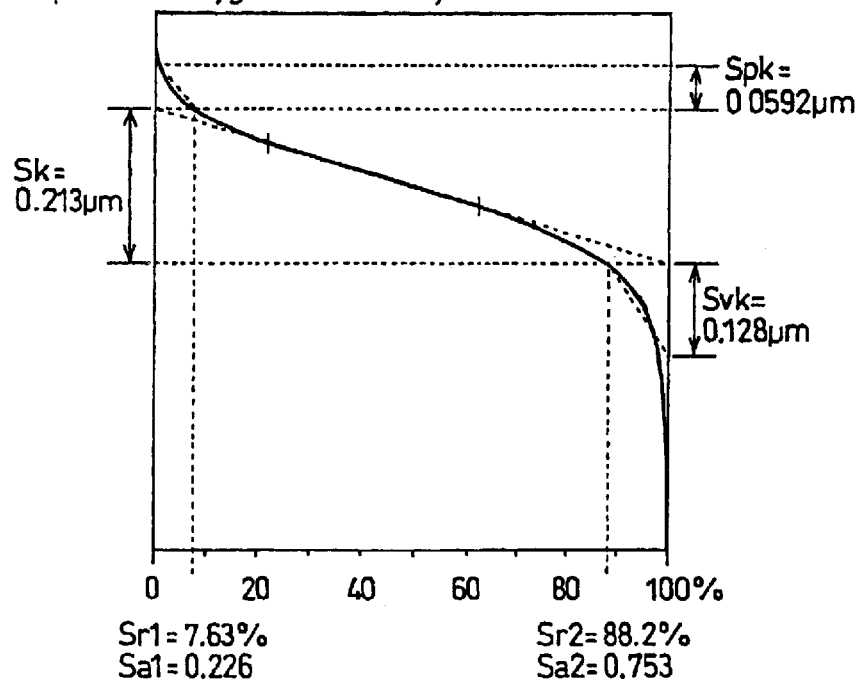
FIG. 7 is a graph showing a bearing curve of a large-diameter side end surface of a tapered roller of a conventional product.

FIG. 7 shows a bearing curve of the large-diameter side end surface 4A of the tapered roller in the conventional product obtained by the above roughness measurement. The symbols in FIG. 7 are the same as those in FIG. 6. It can be found as compared with the bearing curves in FIGS. 6 and 7 that the values of Svk and Sa2 are remarkably greater than those of the conventional product, and this means that depth of the valley existing in the embodiment is deeper. In this invention, the Svk and Sa have the above-described values, but it was found that the plurality of valleys dispersed on a surface which satisfies both the conditions are not arranged in one direction but are arranged in various direction. That is, both the above conditions were not satisfied on a surface where a plurality of valleys are remained in circumferential direction and radial direction.

The non-oil supply seizure test and small amount of oil supply test were carried out for three conventional products and three embodiment products. The tests were carried out in a state in which a pair of tapered roller bearings are incorporated in a back to back manner in a test device (not shown). The inner ring members 3 of both the tapered roller bearings are rotated by the test device.

The non-oil supply seizure test will be explained first. The rotation speed of the inner ring member 3 is 3800 r/min. The rotation speed is achieved within 15 seconds. An axial load Fa of 8 kN is applied to the outer ring member 3. Gear oil (SAE85W-90) is applied to inner ring assembling parts such as the large-diameter side end surface 4A of the tapered roller 4 and the guide surface 8 of the large-diameter side flange 6 of the inner ring member 3 and then, these parts are incorporated in the test device, the device is set aside for 10 minutes and then, the device is operated. A temperature of the gear oil and a room temperature are set from 18 to 19° C. at the time of the test.

Figure 8:
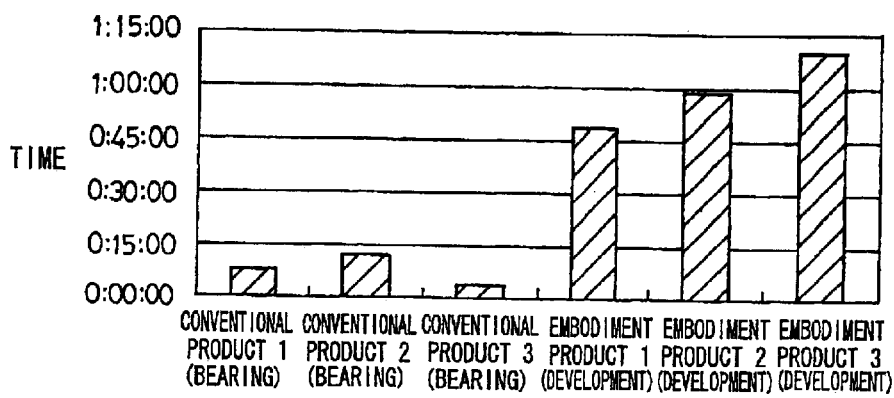
FIG. 8 is a graph showing a result of seizure text with no oil supply with respect to the large-diameter side end surfaces of the tapered rollers of the embodiment products and the conventional products.

A result of the non-oil supply seizure test is shown in FIG. B. A vertical axis in FIG. 8 shows time (unit: hour: minute: second) up to seizure. If the rotation of the inner ring member 3 is locked or spark occurs, it is judged that the seizure is generated. Concretely, the seizure was generated in the conventional product 1 after 7 min and 30 sec, in the conventional product 2 after 12 min and 13 sec, and in the conventional product 3 after 3 min and 27 sec. The seizure was generated in the embodiment product 1 after 48 min and 23 sec, in the embodiment product 2 after 58 min and 42 sec, and in embodiment product 3 after 1 hr, 9 min and 59 sec. Under the same lubricating condition having the same rotation speed and same axial load Fa, the seizure was generated within 13 min in the conventional products 1 to 3, but the seizure was generated in the embodiment products 1 to 3 after 48 min or longer. That is, the embodiment products have several or more times seizure resistance as compared with the conventional products.

Next, the small amount of oil supply test will be explained. The rotation speed of the inner ring member 3 is 3800 r/min. An axial load Fa of 10 kN is applied to the outer ring member 2 in increments of 1 kN. The time interval between the increments of the axial load Fa is 5 min. Concerning the lubrication, 3 mL of gear oil (SAE85W-90) is dropped on the large-diameter side flange 7 of the inner ring member 3 per 1 min. A temperature of the gear oil is 18 to 19° C. at the time of the test.

A result of the small amount of oil supply test is shown in FIG. 9. The vertical axis in FIG. 9 shows the axial load Fa (unit: kN) when the seizure is generated. If the rotation of the inner ring member 3 is locked or spark occurs or a temperature of the bearing excessively rises (200° C.), it is judged that the seizure is generated. Concretely, the seizure was generated in the conventional product 1 at 18 kN, in the conventional product 2 at 16 kN, and in the conventional product 3 at 18 kN. The seizure was generated in the embodiment product 1 at 27 kN, in the embodiment product 2 at 28 kN, and in embodiment product 3 at 30 kN.

If the axial load Fa is incremented at the same rotation speed under the same lubricating condition in this manner, the seizure was generated at the axial load Fa of 16 to 18 kN in the conventional products 1 to 3, and the seizure was generated at the axial load Fa of 27 to 30 kN in the embodiment products 1 to 3. That is, the embodiment products have about 1.5 or more times of seizure resistance as compared with the conventional products. As apparent from the test results, it is possible to largely suppress the seizure of the large-diameter side end surface 4A of the tapered roller 4 and the guide surface of the inner ring member in the embodiment products in any of the non-oil supply and small amount of oil supply states as compared with the conventional products. As apparent from above, in the embodiment, since the surface 4A is worked such that predetermined valleys are disposed on the predetermined smooth surface, it is possible to largely suppress the seizure.

The present invention is not limited to the above embodiment, and the invention can also be applied to the following embodiments.

(1) In the present invention, predetermined valleys may be dispersed in the guide surface 8 of the flange 7. In this case also, like the above embodiment, inconveniences such as seizure and wear can be suppressed. In the invention, predetermined valleys may be dispersed in both the end surface of the tapered roller 4 and the guide surface of the flange 7.

Figure 11:
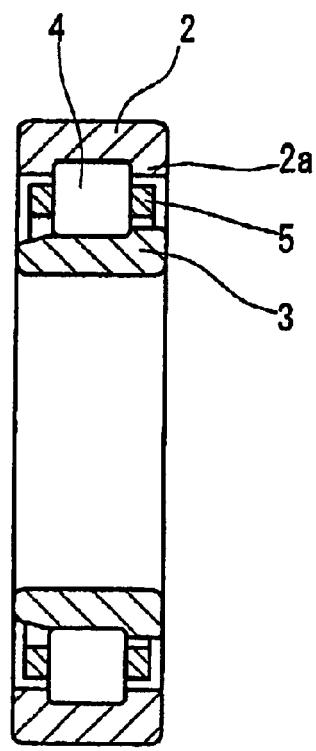
FIG. 11 is a sectional view of another roller bearing to which the present invention is applied.

(2) The present invention can also be applied to a roller bearing provided at its outer ring member 2 with a flange 2a as shown in FIG. 11. In FIG. 11, a reference numeral 2 denotes an outer ring member, a reference numeral 3 represent an inner ring member, a reference numeral 4 denotes a roller, and a reference numeral 5 represent a holding member.

(3) The present invention can also be applied to a roller bearing having columnar or barrel-like rollers between the inner ring member and the outer ring member. In this case, it is possible to disperse predetermined valleys in the end surfaces of the opposite ends of the roller or only one end surface thereof to which a load is strongly applied in the axial direction. It is also possible to disperse predetermined valleys on a guide surface of a flange of an axial end of the inner ring member or the outer ring member on which an end surface of the roller comes into slide contact.

What is claimed is:

1. A roller bearing comprising:

an inner ring member;

an outer ring member which is concentric with radially outside of the inner ring member; and a plurality of rollers interposed between the inner ring member and the outer ring member, wherein a flange having a guide surface for guiding an end surface of the roller in a sliding contact is provided at one of the inner ring member and outer ring member at least, and three-dimensional surface roughness of at least one of the end surface of the roller and the guide surface of the flange is defined to a value which satisfies conditional expressions of $Sa \leq 0.1$ $\mu$m and $0.15$ $\mu m \leq Svk \leq 0.30$ m, where Sa is arithmetical average roughness based on roughness curve and Svk is reduced valley depth based on the Abbott-firestone curve (bearing curve).

2. The roller bearing according to claim 1, wherein the reduced valley depth Svk is defined to a value which satisfies a conditional expression of $0.20$ $\mu m \leq Svk \leq 0.30$ $\mu$m.

3. The roller bearing according to claim 1, wherein the reduced valley depth Svk is defined to a value which satisfies a conditional expression of $0.25$ $\mu m \leq Svk \leq 0.30$ $\mu$m.

4. The roller bearing according to claim 1, wherein the roller is a tapered roller, and the end surface of the roller is a large-diameter side end surface of the tapered roller.

5. The roller bearing according to claim 4, wherein predetermined valleys are dispersed in the large-diameter side end surface of the tapered roller so as to satisfy the conditional expressions, and valleys are formed in the guide surface of the flange in its circumferential direction.

6. The roller bearing according to claim 4, wherein predetermined valleys are dispersed in the large-diameter side end surface of the tapered roller and in the guide surface of the flange so as to satisfy the conditional expressions.

* * * * *